United States Patent Office 3,598,620
Patented Aug. 10, 1971

3,598,620
ALKALI-FREE MOLYBDENUM SEALING HARD GLASS
Saleem Akhtar, Wakefield, Mass., assignor to Transitron Electronic Corporation, Wakefield, Mass.
No Drawing. Filed Apr. 24, 1968, Ser. No. 723,899
Int. Cl. C03c 3/08
U.S. Cl. 106—54                           8 Claims

ABSTRACT OF THE DISCLOSURE

An alkali-free, transparent, homogeneous glass composition is provided comprising the following constituent oxides in percent by weight, silicon dioxide 20–30, aluminum oxide 18, boron oxide 39–47, calcium oxide 11–15 and magnesium oxide 1. A method of forming this alkali-free, transparent, glass composition of this invention is also provided. The glass composition is particularly designed for sealing and encapsulation of electronic devices having molybdenum pins or leads.

BACKGROUND OF THE INVENTION

Many sealing glasses of the borosilicate type have been widely used in the electronics industry to seal glass envelopes to molybdenum pins or leads or to form such envelopes. Such sealing glasses often comprise various proportions of silica, boric oxide and alkali materials which act to control softening point and thermal coefficient of expansion. Some alumina-silicate hard glasses having softening points of between 900° C. to 1000° C. and thermal expansion characteristics of about $45 \times 10^{-7}$ are well-known for use in forming inner envelopes of high pressure discharge lamps and microwave tubes. Such glasses known in the art include Corning 705AJ, G.E.C. HH and G.E.C. H26.

However, most such commercially available molybdenum sealing glasses are not suitable for use in connection with delicate electronic devices such as semiconductors, rectifiers, diodes and the like. Problems arise because of stringent limits based on several important factors of the known molybdenum sealing glasses during their manufacture. Such problems involve fusion temperature characteristics, thermal expansion characteristics, adhesion, electrical properties including resistivity, dielectric strength and ionic mobility, and the incorporation of active impurities which could interfere with semiconductor properties of miniature electronic devices. In some cases, mechanical strength and thermal endurance of known glasses are lacking and do not meet necessary performance characteristics for semiconductor devices. Often when highly mobile ions such as $Li^+$, $Na^+$ and $K^+$ are present in the glass, high ionic mobility results which is a complex function of the composition and structure. Such ionic mobility interferes with electrical characteristics of underlying semiconductor devices.

SUMMARY OF THE INVENTION

By the present invention, an alkali-free, transparent, homogeneous glass composition is formed which is particularly desirable for use in encapsulating or sealing miniature electronic devices having molybdenum pins, leads or other parts which extend through an outer casing which may be of glass. The glass composition comprises silicon dioxide, aluminum oxide, boron oxide, calcium oxide and magnesium oxide. The glass composition of this invention is preferably made by forming a homogeneous batch and melting the batch over a temperature in the range of from about 1400° C. to 1500° C.

The glass composition of the present invention is substantially free of highly mobile ions such as $Li^+$, $Na^+$ and $K^+$. The glass composition has a softening point of between about 730 to 770° C. which is particularly desirable for forming seals and for encapsulating miniature electronic devices. The glass composition has extremely good adhesion to molybdenum and conventional alloys of molybdenum.

The coefficient of thermal expansion of the glass composition of this invention is $51 \times 10^{-7} \pm 5 \times 10^{-7}$ within a temperature range of from about 25° C. to 300° C. which provides a good match in thermal coefficient of expansion for various constituent materials of known miniature electronic devices. For example, silicon diodes have closely matched coefficients of thermal expansion as do other silicon electronic devices which often have outwardly extending leads which may be formed of molybdenum or its alloys. The softening point of the glass is 750° C. in the preferred embodiment and may vary within the range of 730° C. to 770° C. with the glass having a deformation temperature of about 500° C. when computed from the standard thermal expansion curve for the glass composition. The softening point is particularly valuable in the range stated for use of the glass composition in sealing the glass to molybdenum. The glass also has good sealing characteristics with other glass compositions. The above-noted characteristics insure high reliability in encapsulated miniature electronic devices and convenient temperatures for sealing and use of electronic devices.

DESCRIPTION OF PREFERRED EMBODIMENTS

The chemical composition of the alkali-free, transparent, homogeneous, hard glass composition of this invention is listed below in terms of both weight percent and mol percent with each of the constituent oxides being listed with a tolerance range:

|  | Weight Percent | Tolerance, wt. percent ± | Mol Percent |
|---|---|---|---|
| Constituent oxide: |  |  |  |
| $SiO_2$ | 25.0 | 5 | 28.5 |
| $Al_2O_3$ | 18.0 |  | 11.8 |
| $B_2O_3$ | 43.0 | 4 | 42.4 |
| $CaO$ | 13.0 | 2 | 15.9 |
| $MgO$ | 1.0 |  | 1.4 |

In the preferred embodiment, the proportion of constituent oxides are as listed in column 3. However, in some cases, an additional amount of boron oxide of up to 5% by weight can be used to compensate for volatilization losses which may occur under certain melting conditions. In addition, from 0.1 to 0.5% by weight of the glass composition may comprise minor ingredients such as FeO, $As_2O_3$, and/or $Sb_2O_3$. One or more of the above minor ingredients can be incorporated in order to facilitate the mechanism of melting and refining without substantially departing from the formula ranges given above.

In the glass composition of this invention, a low softening point glass is obtained having good thermal expansion characteristics, high transparency and homogeneity. The silicon dioxide provides a network structure. The aluminum oxide provides good insulating properties and dielectric strength. The boron oxide provides for softening characteristics while calcium oxide and magnesium oxide add to high resistivity and high tensile strength of the glass composition. Each of the constituent oxides can have other functions, aside from those noted, in the glass composition as for example, it is obvious that the silicon dioxide also adds to the insulating properties of the glass.

According to the method of this invention, chemically pure raw batch materials are weighed out and preferably in commonly available powder or crystal form and milled to achieve a homogeneous batch mixture. The batch mixture is melted in an electric furnace in incremental amounts preferably at about 1400° C. to avoid swelling or boilover of the batch materials. Thereafter, the temperature of the melt is raised to about 1450° C. and thereafter to 1500° C. with the entire temperature cycle being about 4 hours to permit homogenization. The resulting homogeneous melt can be poured out at standard room temperature to form discs or other shapes which can be later fabricated into small precision parts of any required size and dimensions.

In a specific example of this invention, a 4-pound batch is formed of:

| Ingredients: | Weight percent |
|---|---|
| $SiO_2$ | 25.0 |
| $Al_2O_3$ | 18.0 |
| $B_2O_3$ | 43.0 |
| CaO | 13.0 |
| MgO | 1.0 |

The batch is ball milled for 1 hour using high purity alumina grinding media. The resultant homogeneous batch mixture is then melted in a clean platinum crucible (preferably made from 60% platinum, 40% Rh alloy) in a standard electric furnace. The initial temperature is maintained at 1400° C. while making small equal incremental batch additions at 15 minute intervals over a 30 to 45 minute time period to avoid swelling action or boilover of the batch materials. Preferably the atmosphere in the furnace chamber is neutral and air is present. In some cases, an oxidizing atmosphere formed by a pure dry oxygen or air flow can be used.

After the full batch has been added to the crucible in the furnace, the temperature is raised to 1450° C. for 2½ hours. The melt is mechanically stirred in order to facilitate the melting and refining process. After the 2½ hour period, the temperature is further raised to 1500° C. for about 1 hour to permit homogenization of the batch. The homogeneous melt is then poured out on a clean steel surface at room temperature in the form of thin discs and allowed to cool.

The glass composition can be re-worked or re-formed by conventional procedures to form sleeves or beads of the glass composition as are conventionally known for sealing and encapsulating in the semiconductor art. For example, thin sleeves having inside diameters of about 0.057 inch and outside diameters of 0.085 inch with lengths of 0.080 inch can be formed. Such sleeves can be fused over molybdenum leads of a double lead silicon diode having molybdenum leads extending axially outwardly thereof.

While specific embodiments of the present invention have been described, it should be understood that many variations thereof are possible. For example, the particular electric furnace and crucible used can vary as can the amounts of each batch in melting and refining. The glass composition can be sealed directly to semiconductor bases of silicon or other materials as well as to molybdenum and molybdenum alloy leads of such devices.

In view of the many modifications possible, this invention is to be limited only by the spirit and scope of the appended claims.

What is claimed is:

1. An alkali-free, transparent, homogeneous glass composition having good bonding properties to molybdenum, said glass composition consisting essentially of the following constituent oxides within the ranges stated in percent by weight:

| | |
|---|---|
| $SiO_2$ | 20–30 |
| $Al_2O_3$ | 18 |
| $B_2O_3$ | 39–47 |
| CaO | 11–15 |
| MgO | 1 |

2. An alkali-free, transparent, homogeneous glass composition in accordance with claim 1 wherein said constituent oxides are present in the proportions listed below in percent by weight:

| | |
|---|---|
| $SiO_2$ | 25.0 |
| $Al_2O_3$ | 18.0 |
| $B_2O_3$ | 43.0 |
| CaO | 13.0 |
| MgO | 1.0 |

3. An alkali-free, transparent, homogeneous glass composition in accordance with claim 1 and further comprising from 0.1 to 1.0 percent by weight of at least one constituent selected from the group consisting of FeO, $As_2O_3$ and $Sb_2O_3$.

4. An alkali-free, transparent, homogeneous glass composition in accordance with claim 3 wherein said constituent is FeO.

5. An alkali-free, transparent, homogeneous glass composition in accordance with claim 3 wherein said constituent is $As_2O_3$.

6. An alkali-free, transparent, homogeneous glass composition in accordance with claim 3 wherein said constituent is $Sb_2O_3$.

7. A method of forming an alkali-free, transparent, homogeneous glass composition comprising forming a homogeneous batch of the following constituent oxides within the ranges stated in percent by weight:

| | |
|---|---|
| $SiO_2$ | 20–30 |
| $Al_2O_3$ | 18 |
| $B_2O_3$ | 39–47 |
| CaO | 11–15 |
| MgO | 1 | melting said batch and maintaining said batch at an elevated temperature in the range of from about 1400° C. to about 1500° C.

8. A method in accordance with the method of claim 7 wherein said melting is carried out initially for a period of 30 to 45 minutes at 1400° C. whereupon said temperature is raised to 1450° C. for about 2½ hours followed by raising said temperature to 1500° C. for at least 1 hour to obtain a homogeneous melt.

References Cited

UNITED STATES PATENTS

| 2,161,824 | 6/1939 | Krefft et al. | 106—54X |
| 2,570,020 | 10/1951 | Armistead | 106—54X |
| 2,693,423 | 11/1954 | Rogers | 106—54X |
| 3,056,074 | 9/1962 | Fahey et al. | 317—234 |
| 3,271,124 | 9/1966 | Clark | 317—234 |

HELEN M. McCARTHY, Primary Examiner

U.S. Cl. X.R.

106—48; 117—129; 161—196; 317—234, 3.1